United States Patent [19]
Dainat

[11] Patent Number: 5,243,737
[45] Date of Patent: Sep. 14, 1993

[54] HINGE

[75] Inventor: Markus Dainat, Kropp, Fed. Rep. of Germany

[73] Assignee: Innovation & Development Partners Inc./IDP Inc., Ottawa, Canada

[21] Appl. No.: 712,183

[22] Filed: Jun. 7, 1991

[30] Foreign Application Priority Data

Jun. 8, 1990 [CA] Canada ................. 2018625

[51] Int. Cl.⁵ ................. E05D 7/10; E05D 5/06
[52] U.S. Cl. ................. 16/262; 16/390; 16/DIG. 33
[58] Field of Search ................. 16/262, DIG. 33, 308, 16/390

[56]  References Cited
U.S. PATENT DOCUMENTS

| 1,541,276 | 6/1925 | Powell | 16/DIG. 33 |
| 2,572,145 | 10/1951 | Hendrickson | 16/308 |
| 3,351,402 | 11/1967 | Miller et al. | 16/390 |
| 4,453,482 | 6/1984 | Barker | 16/DIG. 33 |

FOREIGN PATENT DOCUMENTS 799601 8/1958 United Kingdom ................. 16/308

Primary Examiner—John Sipos
Assistant Examiner—Carmine Cuda
Attorney, Agent, or Firm—Notaro & Michalos

[57] ABSTRACT

There is described an improved hinge including first and second spaced apart tangs, an aperture formed through each of the two tangs to be in axial alignment with one another, and a third tang disposed between the first and second tangs. A resilient grommet is supported by and extends axially through the third tang, spacing it from the first and second tangs. The grommet has a cylindrical aperture formed therethrough for axial alignment with the apertures formed through each of the first and second tangs. A hinge pin is inserted through the aperture in the first and second tangs and the cylindrical aperture through the grommet, thereby interconnecting the first, second and third tangs in hinged relationship about the hinge pin.

14 Claims, 3 Drawing Sheets

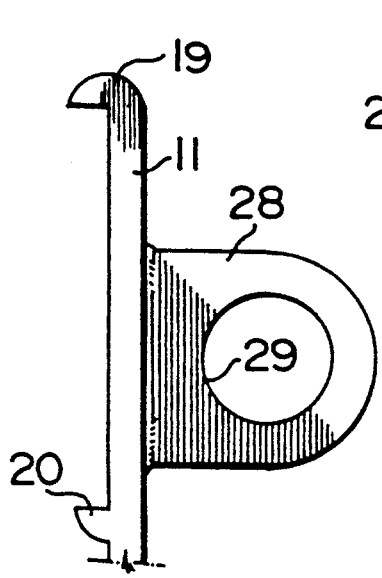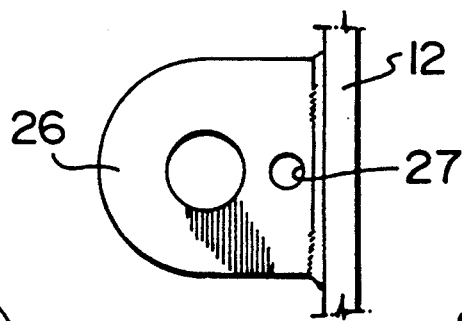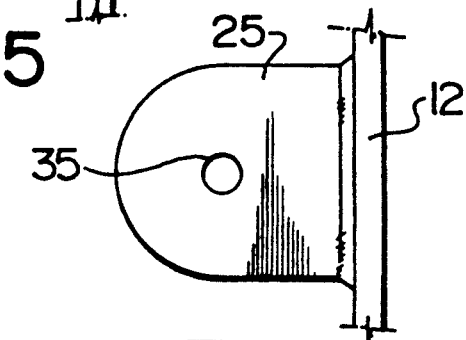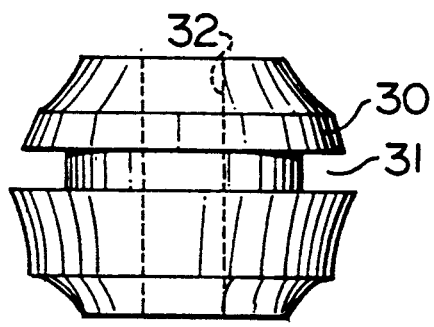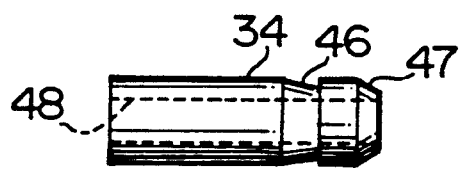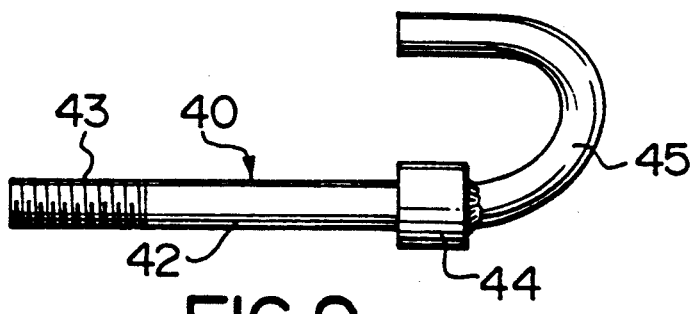

HINGE

FIELD OF THE INVENTION

The present invention relates to a hinge, and more particularly to a hinge for linking together components situated in high stress environments.

BACKGROUND OF THE INVENTION

In marine environments in particular, economic and safety considerations often dictate that larger installations be composed of a number of smaller sub-units linked or preferably hinged together. The hinged joints between sub-units are all severely stressed when differential movement between sub-units occurs due to wave and tidal action, wind, currents, ice and of course normal loading on the sub-units themselves. The installations in question typically include piers, docks, floating platforms and structures assembled and used for the purpose of aquaculture, that is, facilities assembled, anchored and maintained in an exposed marine environment for the holding, raising or culturing of fish stocks and crustaceans. As will be appreciated, such installations are often, if not typically, located in extremely hostile environments, including exposed shorelines and open stretches of water, tidal bays and estuaries and similar habitats. Wind and wave-induced stresses in particular are highly destructive to the extent that many such environments have so far proven completely inhospitable to any installation intended to provide a measure of relative permanence.

For the structures in question to survive, the hinge joints between sub-units must provide a firm coupling, that is, joints with a minimum of play, but at the same time, shock, stress and torsion must be at least partially absorbed without transmission to the structural components of the sub-units.

These characteristics have not so far been successfully combined in an economically and structurally feasible hinge.

SUMMARY OF THE INVENTION

Accordingly, it is an object of the present invention to provide an improved hinge obviating and mitigating from the deficiencies of prior art hinges.

According to the present invention then, there is provided, a hinge comprising first and second spaced apart tang members, an aperture formed through each of said first and second tang members to be in axial alignment with one another, a third tang member disposed between said first and second tang member, a resilient member supported by and extending axially through said third tang member, spacing the latter from said first and second tang members, said resilient member having a cylindrical aperture formed therethrough for axial alignment with said apertures formed through each of said first ad second tang members, and a pin member for axial insertion through said apertures in said first and second tang members and said cylindrical aperture, thereby interconnecting said first, second and third tang members in hinged relationship about said pin member.

According to another aspect of the present invention, there is also provided a hinge component, comprising a tang member, a transversely extending aperture formed axially through said tang member, a resilient member firmly supported within said aperture to extend laterally to both sides of said tang member.

BRIEF DESCRIPTION OF THE DRAWINGS

Preferred embodiments of the present invention will now be described in greater detail and will be better understood when read in conjunction with the following drawings, in which:

FIG. 4 is a side elevational view of the central hinge tang;

FIG. 5 is a side elevational view of one of the outer hinge tangs;

FIG. 6 is a side elevational view of the other outer hinge tang;

FIG. 7 is a plan view of a grommet forming part of the hinge;

FIG. 8 is a plan view of a grommet insert;

FIG. 9 is a plan view of a hinge pin for insertion through the grommet;

DETAILED DESCRIPTION

Figure 1:
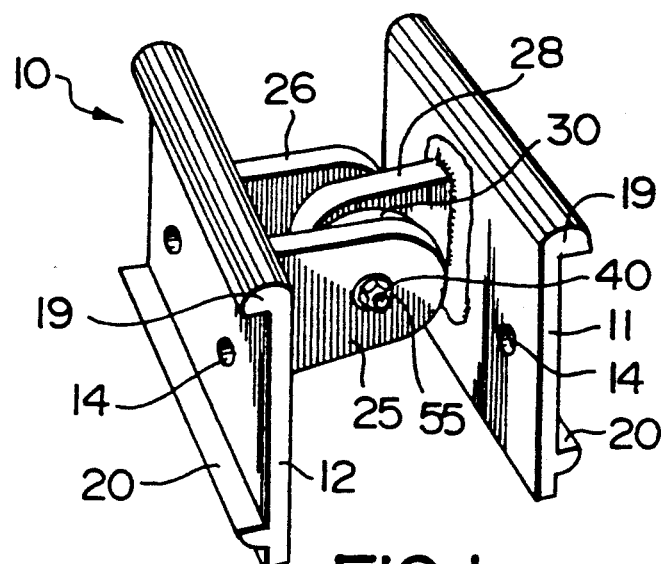
FIG. 1 is a left-side perspective view of the present hinge.
Figure 2:
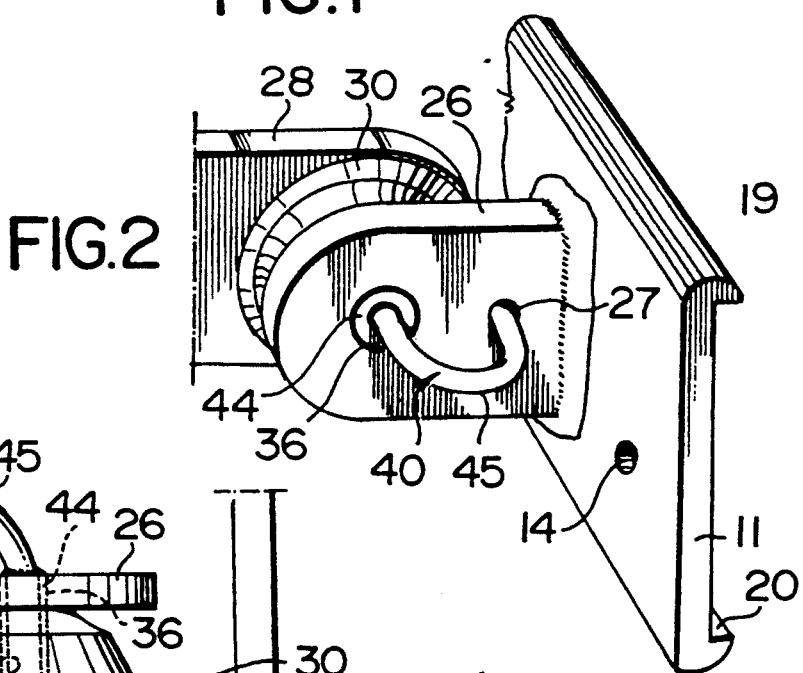
FIG. 2 is a partial right-side perspective view of the hinge of FIG. 1.

With reference to FIGS. 1 and 2, hinge 10 is shown as a complete unit adapted for retrofitting to existing structural sub-units of a dock or similar structure. As will be described below, the hinge may be formed integrally with the sub-units themselves.

Hinge 10 comprises a pair of opposed hinge plates 11 and 12 each having one or more apertures 14 formed therethrough for bolts or similar fasteners used to connect the hinge plates to the sub-units to be hinged together. In the embodiment shown in FIGS. 1 and 2, both hinge plates are formed with upper and lower oppositely facing flanges 19 and 20, respectively. As will be seen most clearly from FIG. 10, flanges 19 and 20 are intended to bracket the abutting upper and lower edges of the sub-units to which the hinge plates are attached to alleviate some of the loading on the connecting bolts. Obviously, where the sides of the sub-units to be hinged together are too tall for bracketing in this fashion, flanges 19 and 20 are dispensed with so that hinge plates 11 and 12 are substantially flat (or perhaps correspondingly curved) to flush fit against the surfaces of the sub-units to which they are to be attached.

Figure 3:
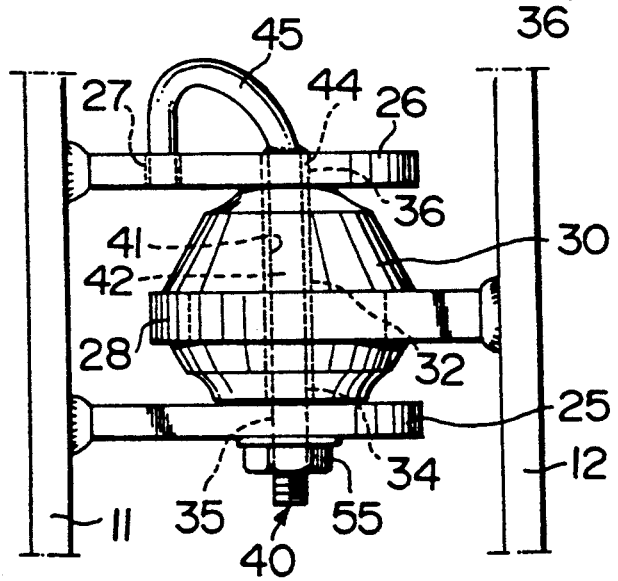
FIG. 3 is a plan view of the hinge.

One or more tangs extend laterally from each of plates 11 and 12. With reference to FIG. 3, a pair of outer tangs 25 and 26 extend orthogonally from plate 11 towards plate 12 and similarly, a central tang 28 extends orthogonally from plate 12 towards plate 11 between tangs 25 and 26. Spacing between the tangs 25 and 26, on the one hand, and tang 28 on the other hand, is maintained by means of a resilient rubber grommet 30 shaped as shown most clearly in FIG. 7.

Grommet 30 is formed with an annular recess 31 which engages an aperture 29 (FIG. 4) in tang 28 to hold the grommet firmly but resiliently in place. The axial width of grommet 30 is substantially equal to the spacing between tangs 25 and 26.

Tangs 25, 26 and 28, and the hinge plates to which they are attached, are connected together by means of hinge pin 40 which passes through axially aligned apertures 35 and 36 in tangs 25 and 26, respectively, and cylindrical aperture 32 formed through grommet 30. Aperture 32 is lined with a rigid, preferably metallic annular sleeve 34 forced through aperture 32 to form a tight but essentially permanent friction fit therewith. Sleeve 34 is shown most clearly in FIG. 8. The inner diameter 48 of the sleeve is substantially equal to the outer diameter 41 of the portion 42 of pin 40 which passes therethrough to minimize "play" of the hinge in relation to grommet 30. Sleeve 34 is formed with bevel 47 at one end to facilitate its insertion into and through aperture 32 in grommet 30 and a machined constriction 46 behind the bevel further facilitates the insertion and acts as a barb to retain the sleeve even more firmly in place.

In addition to limiting play, sleeve 34 tends to protect grommet 30 from excessive wear or damage that might otherwise occur if the grommet were in direct contact with hinge pin 40.

With reference to FIG. 9, hinge pin 40 is essentially cane-shaped, having an elongated portion 42 which extends through sleeve 34 and protrudes through tang 25 to expose threaded portion 43. The pin is enlarged at 44, the enlargement being received into correspondingly enlarged aperture 36 in tang 26. Enlargement 44 abuts against the adjacent end of grommet 30 and sleeve 34 to prevent lateral movement of pin 40 relative to grommet 30 when threaded nut 55 is tightened onto threads 43 to secure pin 40 in place.

It is preferable to provide means preventing pin 40 from itself rotating relative to tangs 25 and 26, particularly as such rotation could result in a loosening of nut 35 to the point of its complete unthreading. One such means found effective by the applicant is the use on the pin of a hooked-shaped portion 45 whereby the outer end of the hook is received into an offset aperture 27 formed through tang 26 when pin 40 is fully inserted through grommet 30 as shown most clearly in FIGS. 2 and 3. This therefore anchors pin 40 for non-rotation relative to tangs 25 and 26.

In use, plates 11 and 12 are free to pivot axially about pin 40. Stress and differential torsional movement of the sub-units to which the hinge plates are attached induced by wind and wave action is damped and absorbed to a highly substantial degree by the resiliency provided the hinge by means of grommet 30 made of a high density, impact-absorbing rubber of the sort used, for example, in aircraft applications. More specifically, tang 28 can twist to a certain extent relative to tangs 25 and 26 and hinge pin 40 by virtue of its connection to these elements through grommet 30. Thus, the normally destructive forces that would otherwise arise as a result of such relative twisting are largely absorbed by the grommet, rather than being transmitted in full as would occur if all connecting elements comprising the hinge were rigid.

Figure 10:
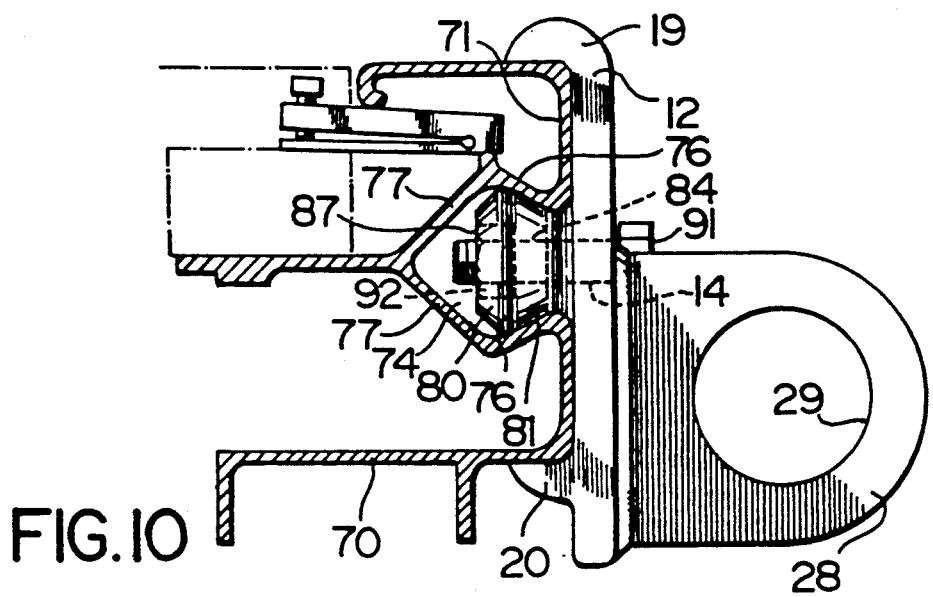
FIG. 10 is a side elevational, partially sectional view showing a connection between the hinge of FIG. 1 and a structural sub-unit.

With reference to FIG. 10, there is shown a connection between one of plates 11 and 12 to the adjoining side surface of a structural sub-unit forming part of a dock, pier or similar structure. The connection can be made simply by bolting the hinge plates to the sides of the sub-units in the usual way. FIG. 10 shows a modified connection intended to provide additional resiliency and shock absorbing capability. The side 71 of sub-unit 70 is formed having a recess 74 therein, the recess having upwardly and outwardly tapering sides 76 merging into inwardly and downwardly tapering sides 77. A hard rubber grommet 80 with sides 81 tapering correspondingly to sides 76 is provided in the recess so that a cylindrical aperture 84 formed through grommet 80 is aligned with bolt 91 extending through bolt hole 14 in plate 12 to engage a nut 92 recessed into rear surface 87 of the grommet. As will be appreciated, the connection made in this fashion provides a little additional "give" to further damp stress and shock. As will also be appreciated, flanges 19 and 20 bracketing the upper and lower surfaces of sub-unit 70 relieve some of the loading on bolt 91.

Figure 11:
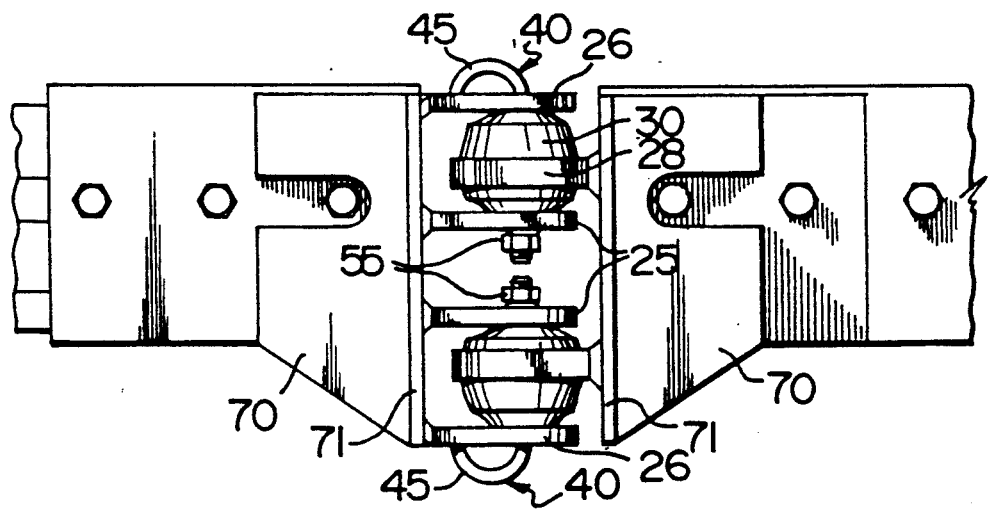
FIG. 11 is a plan view of a double-hinged assembly formed integrally on a structural sub-unit.

With reference to FIG. 11, a double hinged assembly is shown wherein like elements are identified using the same reference numerals as used in the previous figures. The hinge has been further modified so that tangs 25, 26 and 28, rather than being welded or otherwise connected to separate hinge plates 11 and 12, are welded directly to the sides 71 of units 70 to be integral therewith.

Figure 12:
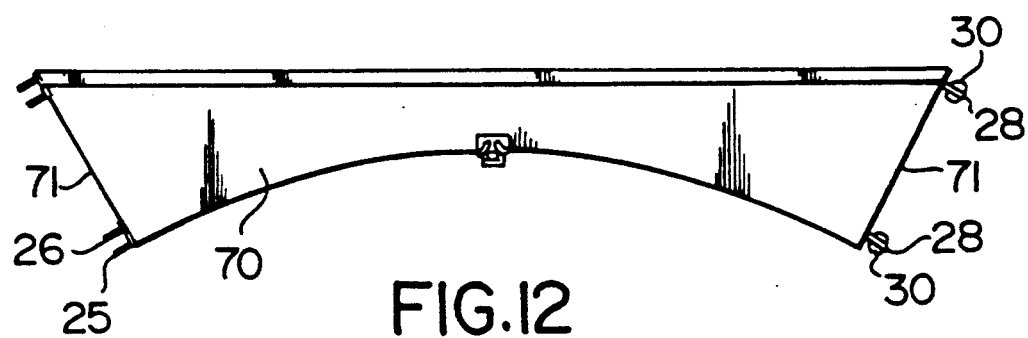
FIG. 12 is a plan view of a structural unit having components of the hinge of FIG. 1 formed integrally thereon.

With reference to FIG. 12, a segment 80 of a floating platform or dock is shown having pairs of tangs 25 and 26 connected thereto at one end 81, and a pair of tangs 28 connected thereto at opposite end 82. Segments 80 may thusly be connected together by means of the present hinges to form a platform surrounding, for example, aquaculture holding tanks or nets. Similarly, the tangs may be disposed at opposite ends of linear segments to form a longitudinally extending pier or dock.

The components of hinge 10 are obviously of robust construction built in accordance with anticipated load factors. If the hinges are to be used in corrosive environments, including salt water, the hinge plate and tangs are advantageously forged or extruded using aluminum, and pin 40 and nut (and washer) 55 are made of stainless steel.

I claim:

1. A hinge comprising:

first and second spaced apart tang members;

an aperture formed through each of said first and second tang members to be in axial alignment with one another;

a third tang member disposed between said first and second tang members;

a resilient member extending axially through said third tang member, spacing the latter from said first and second tang members, said resilient member having a cylindrical aperture formed therethrough for axial alignment with said apertures formed through each of said first and second tang members; and a pin member for axial insertion through said apertures in said first and second tang members and said cylindrical aperture, thereby interconnecting said first, second and third tang members in hinged relationship about said pin member, said pin member including means thereon to prevent the rotation thereof relative to said first and second tang members, said means to prevent rotation comprising, at one end of said pin member, a hook-shaped portion to engage one of said first or second tang members when said pin member is inserted through said first, second and third tang members, thereby anchoring said pin member to prevent its rotation.

2. The hinge of claim 1 wherein said resilient member is a grommet made of a high density, impact absorbing rubber or elastomeric material.

3. The hinge of claim 1 further including a rigid annular sleeve axially disposed in said cylindrical aperture in said resilient member, the inner diameter of said sleeve being substantially equal to the outer diameter of said pin member.

4. The hinge of claim 3 wherein the axial width of said resilient member in the direction of said cylindrical aperture formed therethrough is substantially equal to the spacing between said first and second tang members.

5. The hinge of claim 4 wherein said pin member includes an enlarged, portion adjacent one end thereof to abut said annular sleeve when said pin member is fully inserted through said tang members.

6. The hinge of claim 5 wherein said first and second tang members are rigidly connected to a first hinge plate to extend orthogonally therefrom in parallel, spaced apart relationship.

7. The hinge of claim 6 wherein said third tang member is rigidly connected to a second hinge plate to extend orthogonally therefrom, such that with said pin member inserted through said first, second and third tang members, said first and second hinge plates are in opposed spaced apart relationship to one another.

8. The hinge of claim 7 wherein said hinge plates include thereon spaced apart, parallel opposed flange members adapted to bracket an opposing surface of a unit to which said hinge plates may be attached.

9. A hinge comprising:
   first and second spaced apart tang members;
   an aperture formed through each of said first and second tang members to be in axial alignment with one another;
   a third tang member disposed between said first and second tang member;
   a resilient member extending axially through said third tang member, spacing the latter from said first and second tang members and maintaining said third tang member normally parallel to said first and second tang members, said resilient member having a cylindrical aperture formed therethrough for axial alignment with said apertures formed through each of said first and second tang members, the axial width, of said resilient member in the direction of said cylindrical aperture formed therethrough being substantially equal to the spacing between said first and second tang members;
   a pin member for axial insertion through said apertures in said first and second tang members and said cylindrical aperture, thereby interconnection said first, second and third tang members in hinged relationship about said pin member, wherein said resilient member permits said third tang ember to move nondestructively into non-parallel alignment with said first and second tang members; and
   a rigid annular sleeve axially disposed in said cylindrical aperture in said resilient member, the inner diameter of said sleeve being substantially equal to the outer diameter of said pin member, wherein said pin member includes an enlarged portion adjacent one end thereof to abut said sleeve member when said pin member is fully inserted through said tang members.

10. The hinge of claim 9 wherein said resilient member includes a groove extending circumferentially thereabout to closely receive said third tang member therein for connection thereto.

11. The hinge of claim 10 wherein said pin member includes means thereon to prevent the rotation thereof relative to said first and second tang members, said means to prevent rotation comprising, at one end of said pin member, a hook-shaped portion to engage one of said first or second tang members when said pin member is inserted through said first, second and third tang members, thereby anchoring said pin member to prevent its rotation.

12. The hinge of claim 11 wherein said first and second tang members are rigidly connected to a first hinge plate to extend orthogonally therefrom in parallel, spaced-apart relationship and wherein said third tang member is similarly rigidly connected to a second hinge plate to extend orthogonally therefrom, such that with sad pin member inserted through said first, second and third tang members, aid first and second hinge plates are in opposed spaced-apart relationship to one another.

13. The hinge of claim 12 wherein said resilient member is a grommet made of a high density, impact absorbing rubber or elastomeric material.

14. The hinge of claim 13 wherein said hinge plates include thereon spaced apart, parallel opposed flange members adapted to bracket an opposing surface of a unit to which said hinge plates may be attached.

* * * * *